(12) United States Patent
Watanabe

(10) Patent No.: US 6,777,832 B2
(45) Date of Patent: Aug. 17, 2004

(54) HIGH-THRUST LINEAR MOTOR AND METHOD OF PRODUCING THE SAME

(75) Inventor: Munenori Watanabe, Tokyo (JP)

(73) Assignee: THK Co., Ltd., Tokyo (JP)

( * ) Notice: Subject to any disclaimer, the term of this patent is extended or adjusted under 35 U.S.C. 154(b) by 50 days.

(21) Appl. No.: 09/766,584

(22) Filed: Jan. 23, 2001

(65) Prior Publication Data

US 2001/0010433 A1 Aug. 2, 2001

(30) Foreign Application Priority Data

Jan. 28, 2000 (JP) ........................................ 2000-024721

(51) Int. Cl.$^7$ .............................................. H02K 41/00
(52) U.S. Cl. ........................................................ 310/12
(58) Field of Search ........................ 310/12–14; 318/135

(56) References Cited

U.S. PATENT DOCUMENTS

| | | | |
|---|---|---|---|
| 3,622,818 A | * 11/1971 | Payen | 310/13 |
| 3,787,716 A | * 1/1974 | La France | 318/135 |
| 3,912,992 A | * 10/1975 | Lamb | 318/135 |
| 4,287,444 A | * 9/1981 | Popov et al. | 310/13 |
| 4,758,750 A | 7/1988 | Itagaki et al. | 310/13 |
| 5,373,120 A | * 12/1994 | Barrett et al. | 187/316 |
| 5,519,266 A | 5/1996 | Chitayat | 310/12 |
| 5,644,178 A | * 7/1997 | Halm | 310/43 |
| 5,738,053 A | * 4/1998 | Kato | 123/90.15 |
| 5,783,877 A | * 7/1998 | Chitayat | 310/12 |
| 5,808,381 A | 9/1998 | Aoyama et al. | 310/12 |
| 5,808,382 A | 9/1998 | Ira et al. | 310/12 |
| 6,040,642 A | * 3/2000 | Ishiyama | 310/12 |

FOREIGN PATENT DOCUMENTS

| | | |
|---|---|---|
| EP | 0 949 748 | 10/1999 |
| JP | 2-74144 | 3/1990 |

OTHER PUBLICATIONS

Copy of European Patent Office Communication including European Search Report for corresponding European Patent Application No. 01101717 dated Dec. 23, 2002.

* cited by examiner

Primary Examiner—Burton S. Mullins
Assistant Examiner—Judson H. Jones
(74) Attorney, Agent, or Firm—Westerman, Hattori, Daniels & Adrian, LLP

(57) ABSTRACT

A high-thrust linear motor having coils wound with a minimal blank space in slots of a magnetic member (core) to generate high thrust and permit smooth movement of a moving member. The high-thrust linear motor includes a magnetic member having a plurality of slots formed in series in an axial direction thereof. The slots extend from both sides of the magnetic member in opposite directions intersecting the axial direction in corresponding relation to each other. Coils having a plurality of phases are wound in respective pairs of slots on both sides of the magnetic member. Field magnets extend in the axial direction at both sides of the magnetic member so as to face an effective conductor portion of each coil. Each field magnet has a plurality of pairs of magnetic poles magnetized in the axial direction. According to a method of producing the high-thrust linear motor, coils are wound in respective pairs of slots on both sides of the magnetic member while the magnetic member is being rotated.

4 Claims, 11 Drawing Sheets

HIGH-THRUST LINEAR MOTOR AND METHOD OF PRODUCING THE SAME

BACKGROUND OF THE INVENTION

1. Field of the Invention

The present invention relates to a high-thrust linear motor in which armature coils and field magnets are arranged linearly to convert electrical energy supplied by the armature coils directly into linear kinetic energy with high thrust through the field magnets.

2. Discussion of Related Art

There is a linear motor that converts electrical energy directly into linear kinetic energy by utilizing repulsive or attractive magnetic force. This linear motor, for example, has a moving part consisting essentially of an armature winding formed from wound coils (electromagnets) and a stationary part having field magnets (permanent magnets) arranged along a guide. The moving part is caused to travel linearly along the guide serving as a stationary-side member by utilizing repulsive or attractive magnetic forces acting between the armature coils and the field magnets, thereby converting electrical energy into linear kinetic energy.

Linear motors arranged as stated above include two different types, i.e. coreless linear motors having no core in the armature winding, and cored linear motors having a core in the armature winding.

The coreless armature winding consists only of wound coils and therefore causes minimal variations in travel (cogging) of the moving part due to variations in magnetic reluctance that occur during the travel of the moving part. Further, the coreless armature winding is light in weight because it has no core. Therefore, the coreless armature winding is generally used in small-sized linear motors.

The cored armature winding can be arranged to provide thrust 2 to 3 times as high as that of coreless linear motors simply by inserting a core (magnetic member) into the hollow portion of an air-core armature winding, which has no core. Therefore, the cored armature winding is usually used in high-thrust linear motors.

There is a linear motor in which a large number of coils are wound in a plurality of slots formed in a core to form an armature winding, and the effective conductor portions of the armature coils are opposed to field magnets. It is known that this type of linear motor provides increased thrust because an increased number of coils can be wound in the slots.

In other words, it is known that high thrust can be obtained with a linear motor by adopting an arrangement in which: (1) a cored armature is used; (2) slots are formed in the core of the armature; and (3) a large number of coils are wound in the slots.

Next, a conventional cored linear motor having coils wound in slots will be described. FIGS. 1 and 2 are a front view and a longitudinal sectional view, respectively, showing the arrangement of the cored linear motor. This cored linear motor is a three-phase linear motor and has a moving part 1 and a stationary part 2 as shown in FIG. 1.

As shown in FIG. 2, the moving part 1 includes a core 1a and a table 1b secured to the upper surface of the core 1a. The moving part 1 further includes coils C1, C2 and C3. The core 1a is formed with slots S. The coils C1, C2 and C3 are prewound coils and each inserted into two slots S separated by other slots S. The core 1a and the coils C1, C2 and C3 constitute an armature winding.

It should be noted that the reason why the prewound coils C1, C2 and C3 are inserted into the slots S is to facilitate the assembly. The coils C1, C2 and C3 are inserted in the following sequence. First, a U-phase coil C1, a W-phase coil C2 and a V-phase coil C3 are inserted into respective pairs of slots S in the order mentioned so as to lie adjacent to the innermost parts of the slots S. Thereafter, a V-phase coil C3 is inserted into two slots S in such a manner as to be superimposed on the U-phase coil C1 and the W-phase coil C2 so that the V-phase coil C3 is different in electrical angle from the phases inserted into the innermost parts of the slots S. Similarly, a U-phase coil C1 is inserted into two slots S in such a manner as to be superimposed on the W-phase coil C2 and the V-phase coil C3 so that the U-phase coil C1 is different in electrical angle from the phases inserted into the innermost parts of the slots S.

Meanwhile, the stationary part 2 is, as shown in FIGS. 1 and 2, formed from a yoke 2a and field magnets (permanent magnets) 2b. The yoke 2a and the field magnets 2b are disposed to extend linearly so as to face the moving part 1.

When the coils C1, C2 and C3 are energized, electric currents flow in the directions of the arrows in FIG. 3, thus producing magnetic flux. Consequently, repulsive or attractive forces act between the coils C1, C2 and C3 and the field magnets 2b opposed thereto. Thus, thrust is generated in the leftward or rightward direction as viewed in FIGS. 2 and 3, causing the moving part 1 to move.

With the prior art, however, a problem arises when it is intended to achieve a reduction in size of a linear motor with a cored armature winding having the above-described conventional structure. That is, because it is impossible to obtain a large amount of winding of coils in comparison to the weight of the core, the cored armature winding is inferior in the level of attainable thrust to a coreless armature winding having the same weight. This has heretofore been an obstacle to achievement of a compact cored linear motor.

In addition, the conventional cored linear motor having the above-described structure suffers from the problem that the relative movement of the magnetic field is not smooth because of the manner of winding the coils. That is, after a U-phase coil C1 and a W-phase coil C2 have been inserted, a V-phase coil C3 is inserted so as to lie over the area between the U-phase coil C1 and the W-phase coil C2. Therefore, there are overlaps between the coils, and this prevents smooth relative movement of the magnetic field.

On the other hand, when prewound coils C1, C2 and C3 are inserted with a phase (electrical angle) displacement, as shown in FIG. 2, there is a blank space where no coil is wound in a slot S at each end of the core 1a, and the amount of winding of coils on the core 1a is correspondingly reduced. Accordingly, a desired high thrust cannot be obtained.

SUMMARY OF THE INVENTION

An object of the present invention is to provide a high-thrust linear motor in which the amount of winding of coils can be increased in comparison to the weight of the core to obtain increased thrust and the linear motion of the moving part is favorably smooth.

Another object of the present invention is to provide a method of producing a high-thrust linear motor that allows coils to be wound in such a manner that there is no blank space where no coil is wound in a slot at each end of the core.

To attain the above-described objects, the present invention provides a high-thrust linear motor including a magnetic member having a plurality of slots formed in series in an axial direction thereof. The slots extend from both sides of the magnetic member in opposite directions intersecting the axial direction in corresponding relation to each other. Coils are wound in respective pairs of slots on both sides of the magnetic member. Field magnets extend in the axial direction at both sides of the magnetic member so as to face an effective conductor portion (a portion contributing to the generation of thrust) of each of the coils. Each field magnet has a plurality of pairs of magnetic poles magnetized in the axial direction.

With the above-described arrangement, because the coils can be wound over both sides of the magnetic member through the slots formed on both sides of the magnetic member, the space efficiency (density) of the coils is increased, so that it is possible to obtain higher thrust than in the case of the conventional cored linear motor. Accordingly, it becomes possible to attain a compact cored linear motor.

The high-thrust linear motor according to the present invention has the above-described matters as essential constituent elements. However, the following matters may be added to the constituent elements:

The arrangement may be such that the coils have a plurality of phases and are wound in respective pairs of slots in the magnetic member in such a manner that each pair of adjacent phases are different in electrical angle from each other.

With the above-described arrangement, it is possible to obtain a smooth operating condition equal to that obtained with a distributed winding type coil.

The high-thrust linear motor according to the present invention may further include a cover member for covering the magnetic member and the coils approximately entirely, exclusive of effective conductor portions of the magnetic member and the coils.

With the above-described arrangement, the cover member covers the armature having the coils wound on approximately the entire area of the magnetic member, and this cover member is secured to a table or other moving member, whereby the armature is prevented from directly contacting the table or other moving member, and the armature can be surely secured to the table or the like through the cover member.

Further, the arrangement may be such that the cover member is divided into a pair of cover elements disposed to cover the magnetic member and the coils approximately entirely, and connecting members for integrally connecting together the pair of cover elements are provided.

The above-described arrangement facilitates the operation of securing the magnetic member and the coils to the cover member.

Furthermore, the connecting members may be formed from a material having high thermal conductivity and disposed in contact with or close proximity to the magnetic member.

With the above-described arrangement, the connecting members act as a radiator, whereby heat generated from the coils can be dissipated to the outside without storing it in the magnetic member. Accordingly, it is possible to prevent reduction of thrust as occurs when the magnetic member is heated. It should be noted that a metal, for example, aluminum, is preferably used as a material having high thermal conductivity.

Furthermore, a non-magnetic material may be filled in the space between the magnetic member and the coils on the one hand and the cover member on the other.

With the above-described arrangement, the magnetic member, the coils and the cover member are integrated in close contact with each other. Therefore, none of the magnetic member, the coils and the cover member will be deformed when the assembly of these members moves linearly or stops. Accordingly, the assembly of the magnetic member, the coils and the cover member is suitable for use as a moving part.

In addition, the present invention provides a method of producing a high-thrust linear motor. According to the high-thrust linear motor producing method, a magnetic member is prepared which has a plurality of slots formed in series in an axial direction thereof. The slots extend from both sides of the magnetic member in opposite directions intersecting the axial direction in corresponding relation to each other. Then, coils are wound in respective pairs of slots on both sides of the magnetic member while the magnetic member is being rotated.

According to the method of the present invention, the coils are wound directly in the slots unlike the conventional process in which prewound coils are inserted into slots. Therefore, there will be no blank space where no coil is wound in the slots. Accordingly, it is possible to obtain a smooth operating condition equal to that obtained with a distributed winding type coil. Thus, it is possible to produce a high-thrust linear motor having increased space efficiency and capable of providing increased thrust.

The above and other objects, features and advantages of the present invention will become more apparent from the following description of the preferred embodiments thereof, taken in conjunction with the accompanying drawings.

DESCRIPTION OF THE PREFERRED EMBODIMENTS

A high-thrust linear motor according to an embodiment of the present invention will be described below with reference to FIGS. 4 to 9.

[Structure of the High-Thrust Linear Motor]

Figure 1:
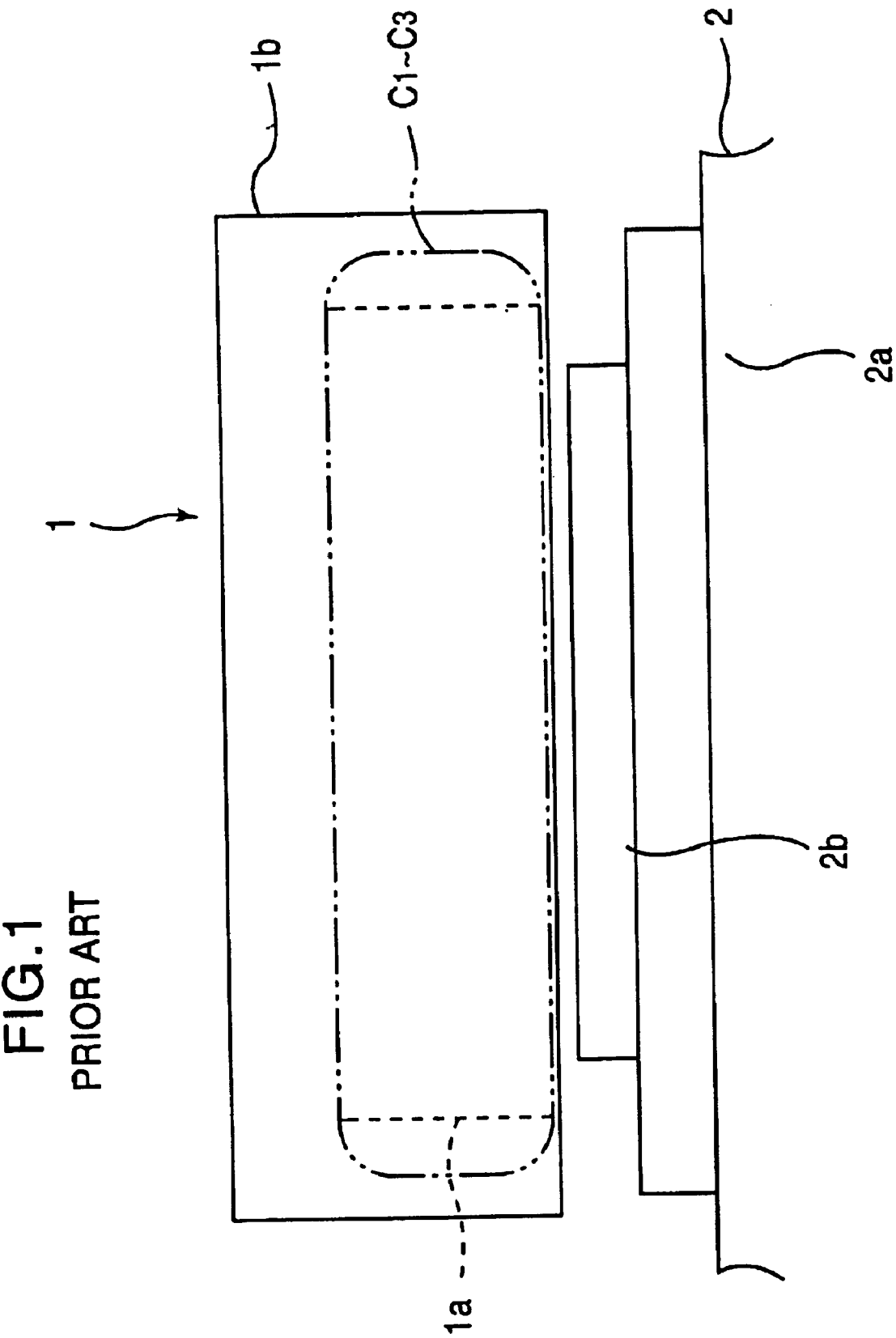
FIG. 1 is a front view of a conventional linear motor.
Figure 2:
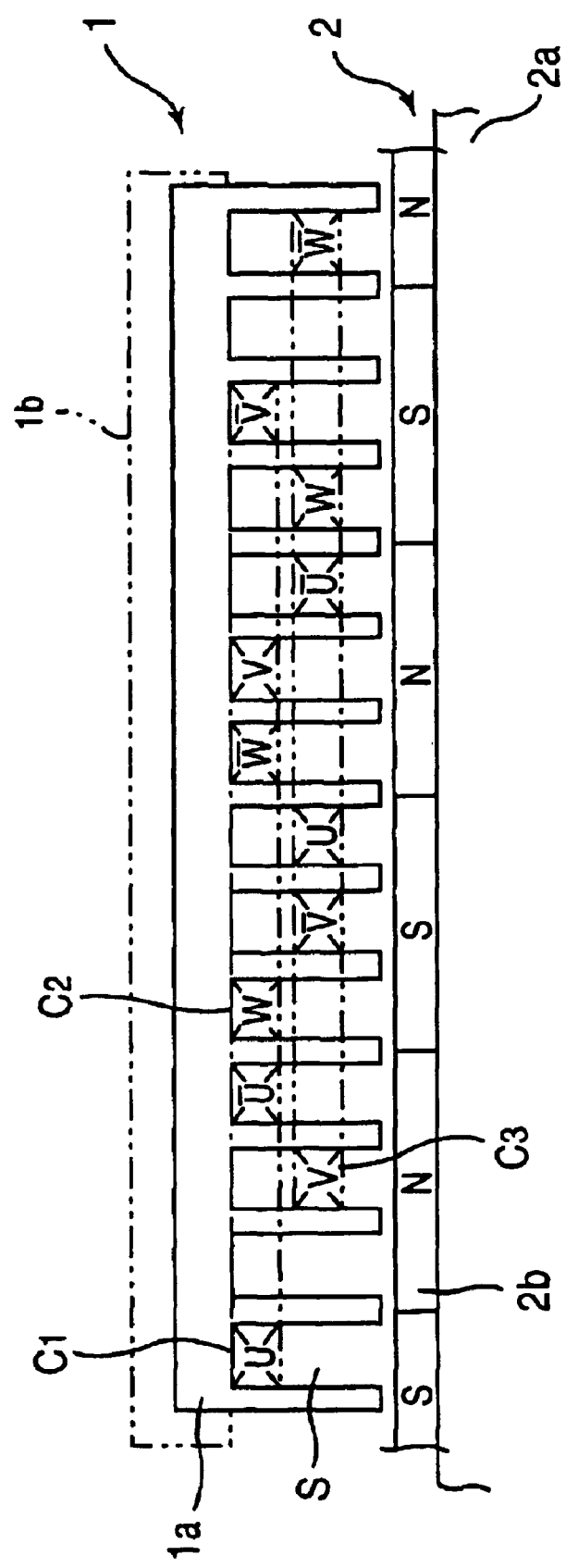
FIG. 2 is a longitudinal sectional view of the conventional linear motor.
Figure 3:
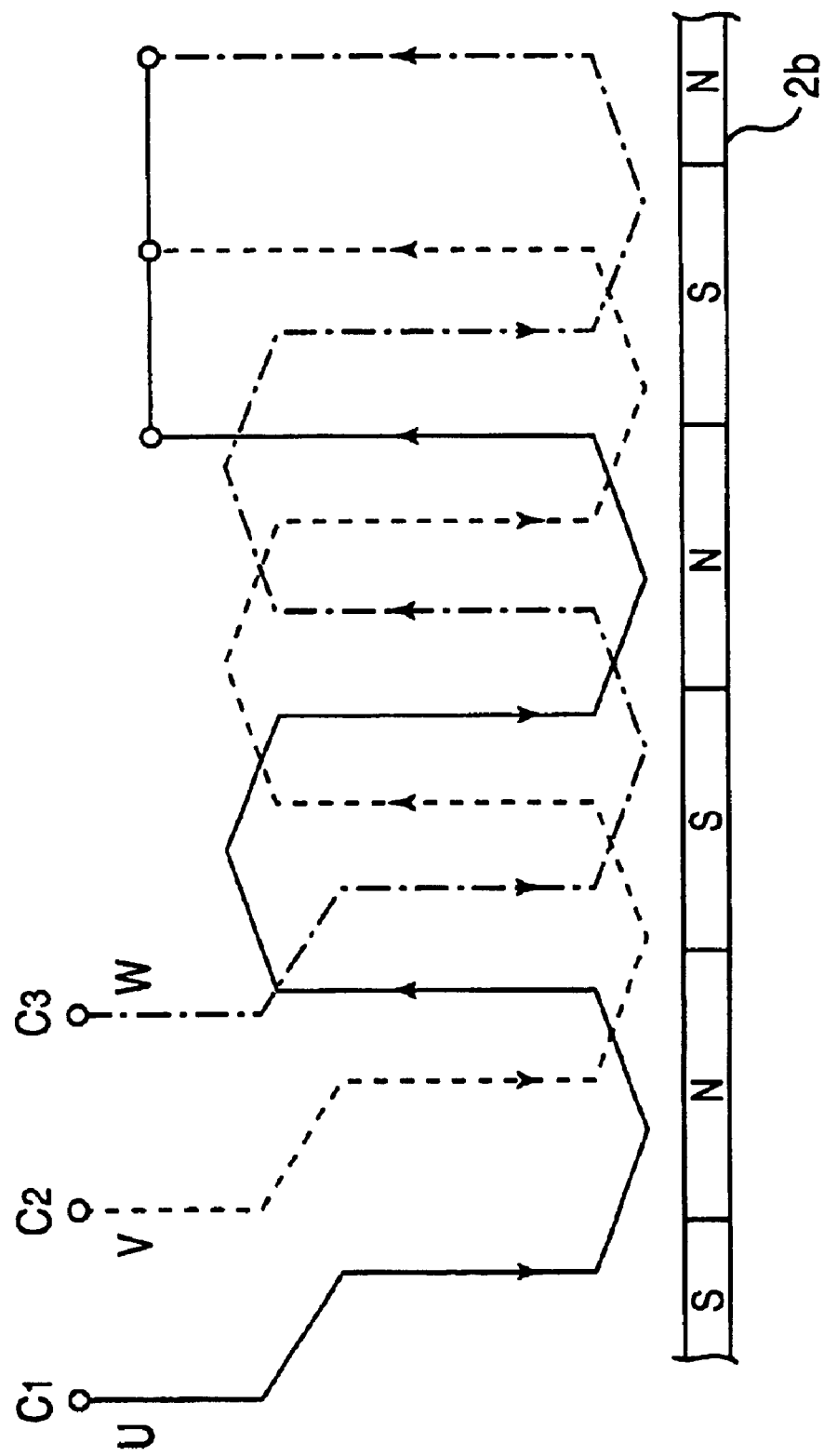
FIG. 3 is a diagram showing a conventional arrangement of three-phase coils.
Figure 4:
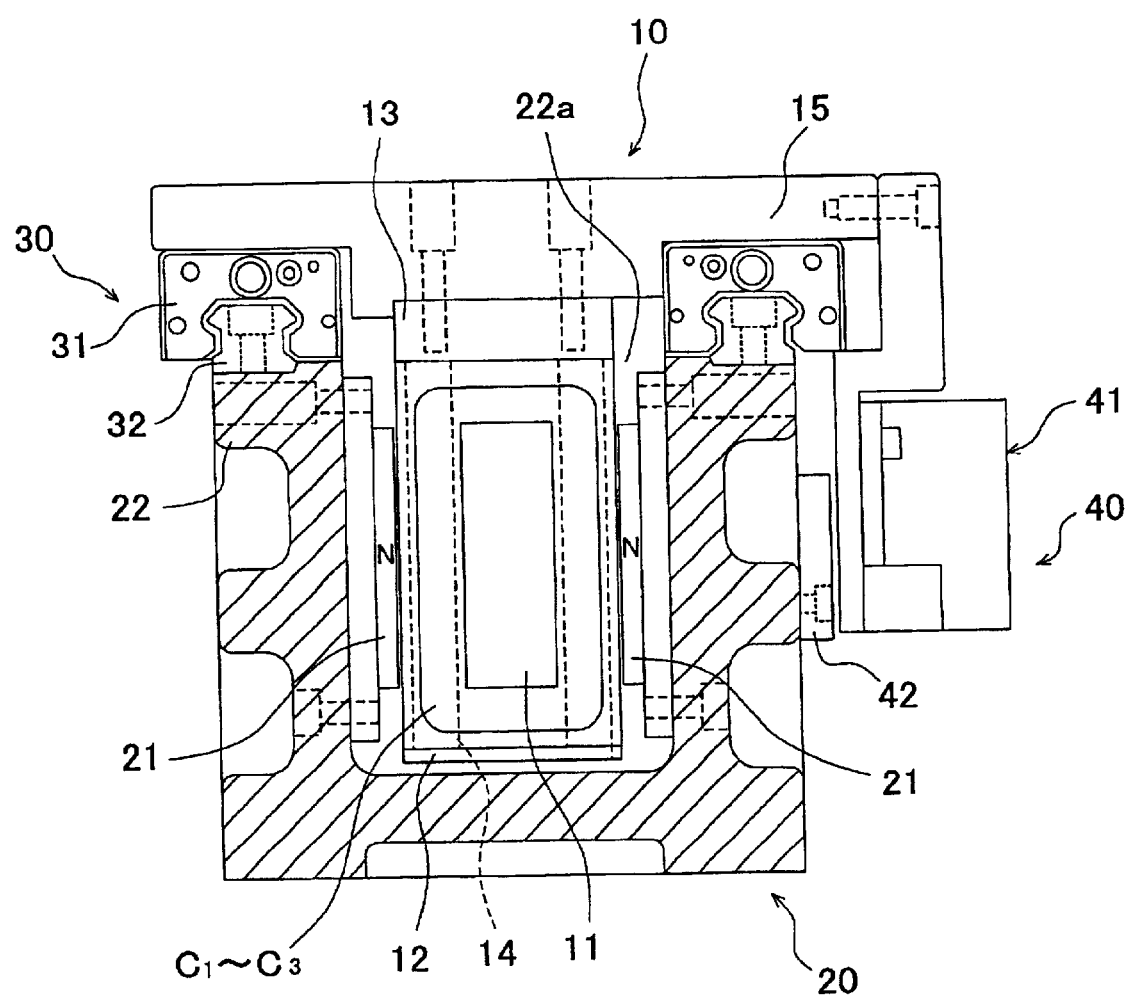
FIG. 4 is a cross-sectional view of a high-thrust linear motor according to an embodiment of the present invention.

FIG. 4 shows the sectional structure of the high-thrust linear motor. As shown in the figure, the high-thrust linear motor has a moving part 10, a stationary part 20, a linear guide 30, and a linear encoder 40. The moving part 10 is movably connected to the stationary part 20 through the linear guide 30 so as to be linearly slidable.

The linear encoder 40 has a sensor moving part 41 secured to a side portion of the moving part 10. A linear scale 42 is secured to a side portion of the stationary part 20 to extend along it. The linear encoder 40 is adapted to detect a travel position of the moving part 10.

Figure 5:
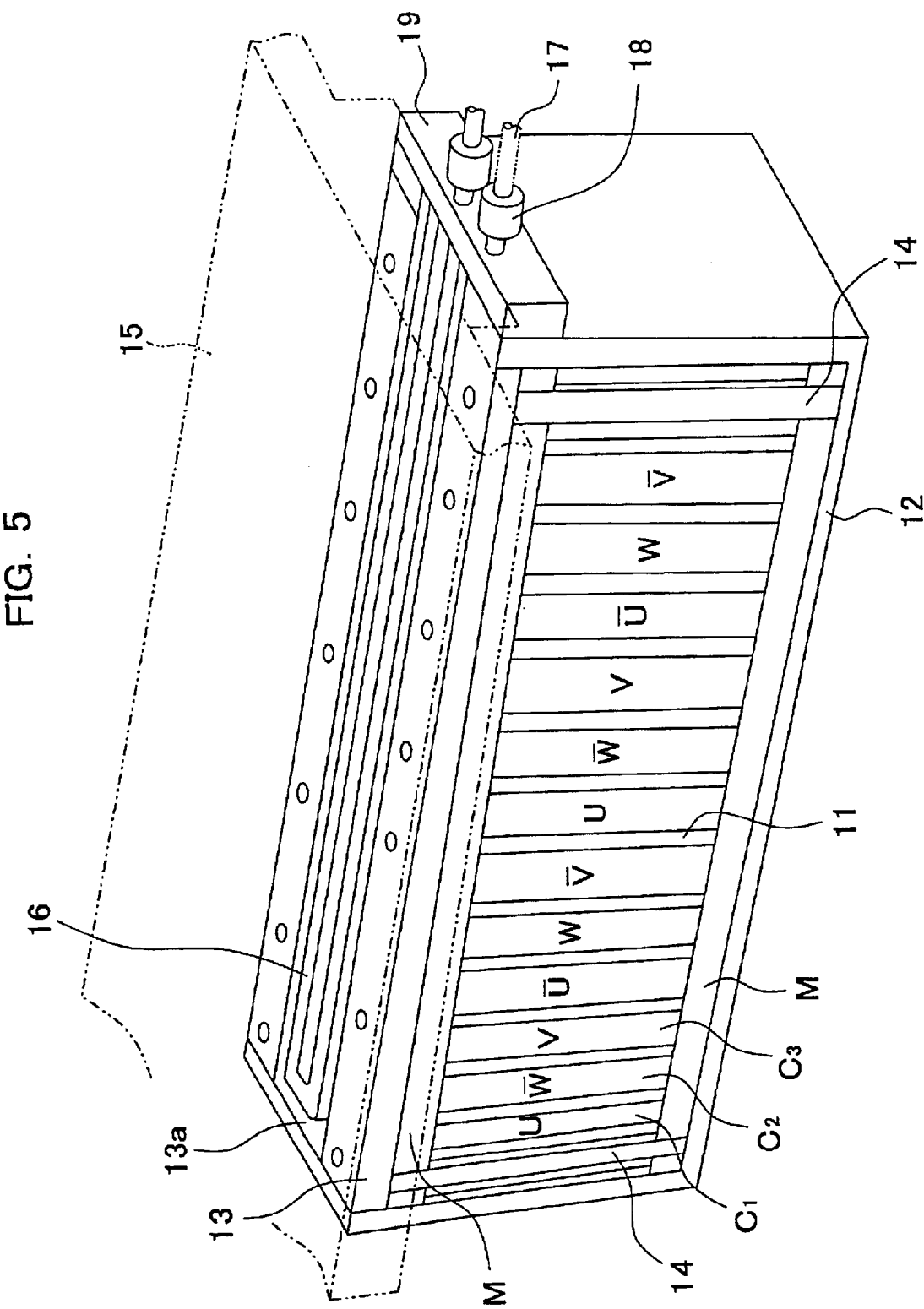
FIG. 5 is a perspective view of a moving part of the high-thrust linear motor according, to the embodiment of the present invention.

As shown in FIG. 5, the moving part 10 includes a core (magnetic member) 11 wound with coils C1, C2 and C3. A side core cover 12 and a top core cover 13 cover the core 11 and the coils C1, C2 and C3 approximately entirely, exclusive of effective conductor portions Cb thereof (see FIG. 9). Cover mounting plates (connecting members) 14 secure the core 11 to both the side core cover 12 and the top core cover 13. The moving part 10 further includes a table 15 on which an object to be conveyed is placed.

The core 11 is composed of a stack of blanked magnetic steel sheets.

Figure 6:
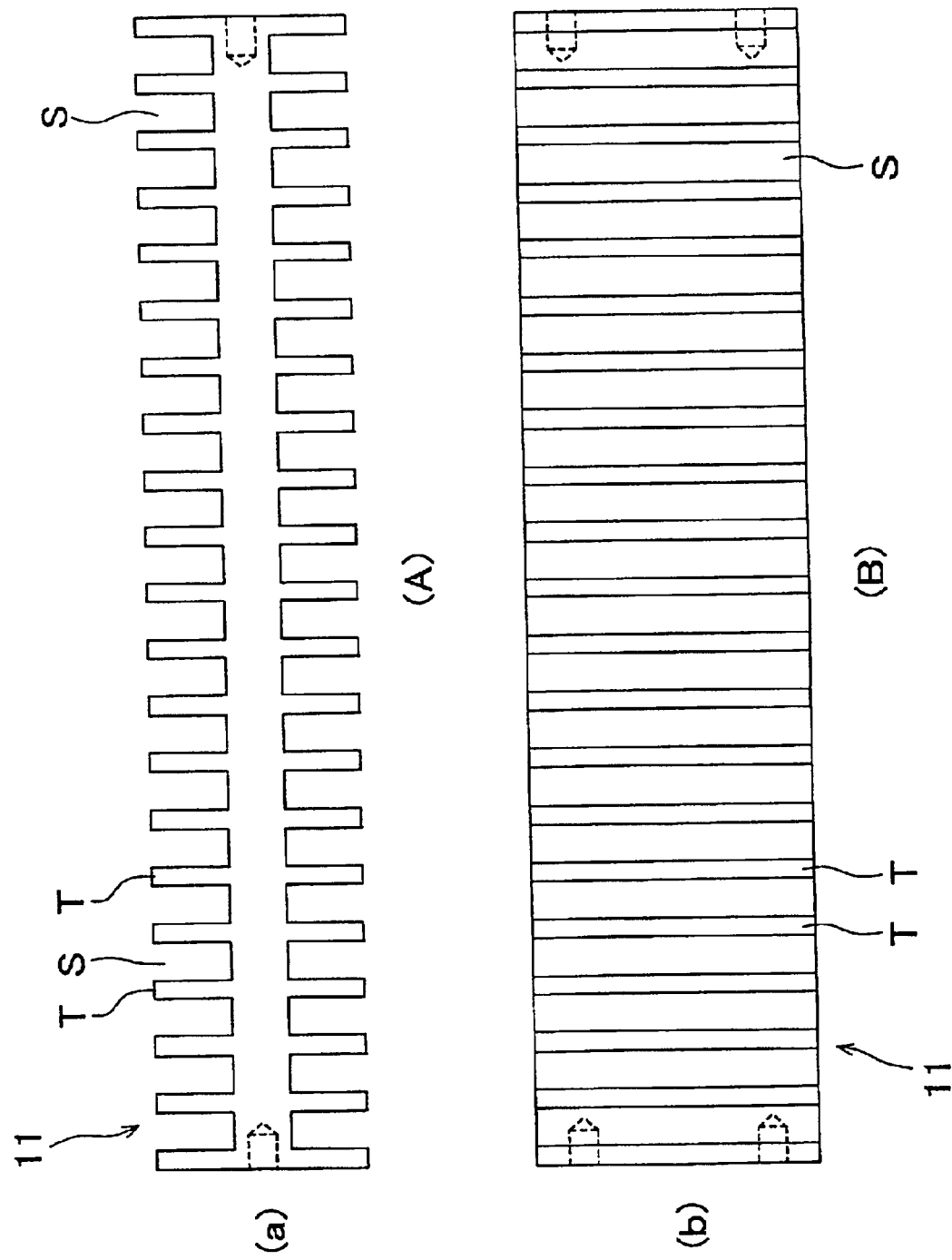
FIG. 6 is a diagram showing the details of a magnetic member (core) used in the high-thrust linear motor according to the embodiment of the present invention, in which part (A) is a plan view, and part (B) is a side view.

Parts (A) and (B) of FIG. 6 are plan and side views showing the arrangement of the core 11. The core 11 has a plurality of teeth (salient poles) T and slots S formed alternately. The teeth T project from both sides of the core 11 in opposite directions intersecting the direction of the axis of the core 11. The slots S are each formed between a pair of adjacent teeth T.

Figure 7:
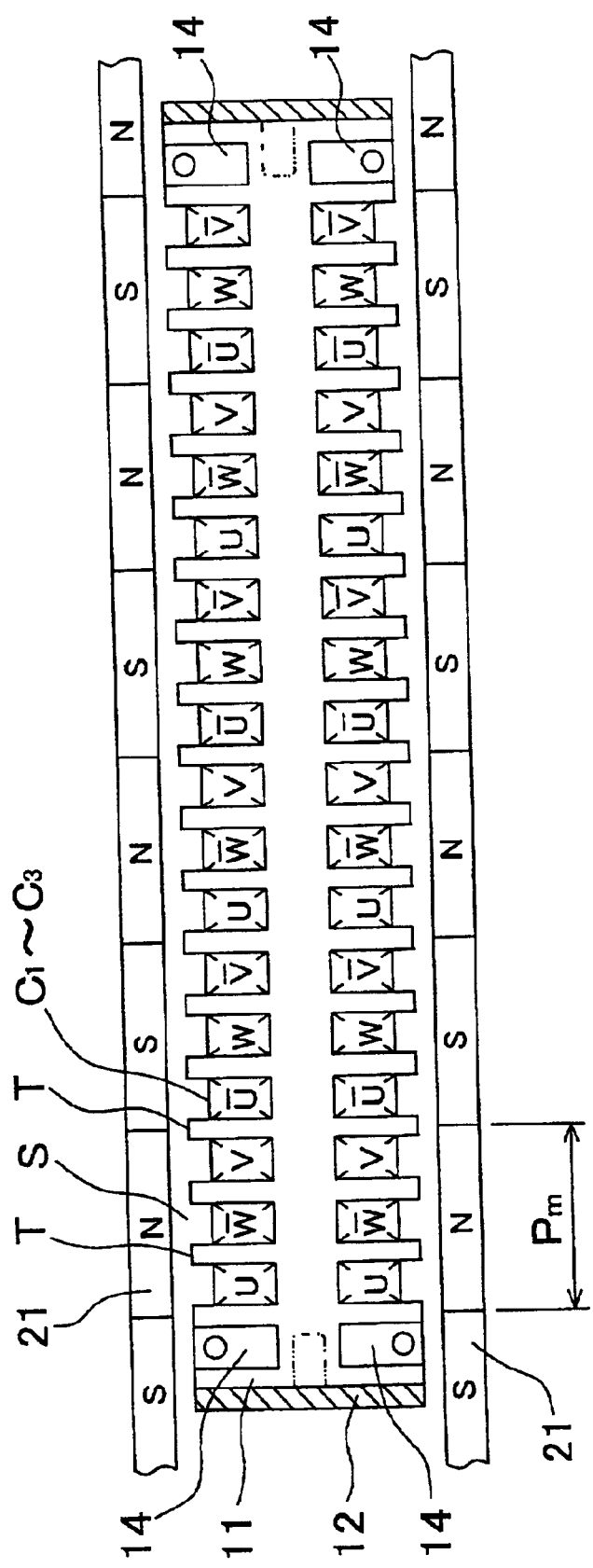
FIG. 7 is a sectional plan view of the moving part of the high-thrust linear motor according to the embodiment of the present invention.

As shown in FIGS. 5 and 7, the coils C1, C2 and C3 are composed of three-phase coils, i.e. a U-phase coil C1, a W-phase coil C2, and a V-phase coil C3, which are wound in associated pairs of slots S on both sides of the core 11 one after another. Accordingly, the high-thrust linear motor according to this embodiment is a three-phase linear motor.

The U-phase coil C1, the W-phase coil C2 and the V-phase coil C3 are wound in respective slots S in the order mentioned in such a manner that each pair of adjacent phases are different in electrical angle from each other.

It should be noted that the mark "−" put to the letters U, W and V indicating phases in FIGS. 5 and 7 shows that the coil winding direction of the relevant phase is opposite to that of a phase adjacent thereto.

The coils C1, C2 and C3 wound on the core 11 constitute a three-phase armature in which three phases are displaced relative to one another by a ⅓ pitch with respect to the width Pm of one magnetic pole.

Figure 9:
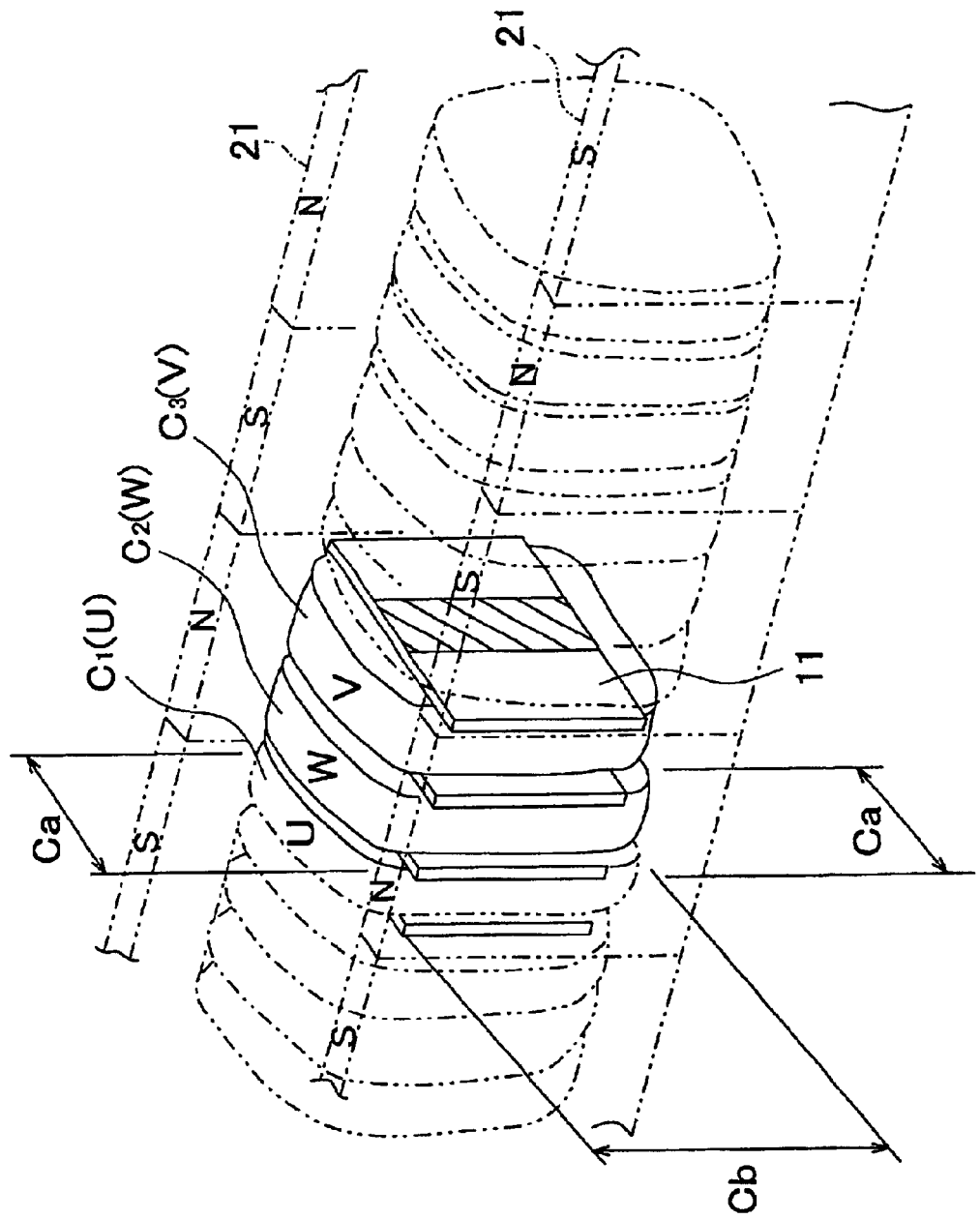
FIG. 9 is an enlarged view of a part where the three-phase coils are wound.

As shown in FIG. 9, each of the coils C1, C2 and C3 is divided into ineffective conductor portions Ca at the upper and lower ends thereof, which do not contribute to the generation of thrust, and an effective conductor portion Cb at a side portion thereof, which contributes to the generation of thrust.

The side core cover 12 and the top core cover 13 constitute a pair of cover elements, which are formed from an aluminum-based material. The side core cover 12 is formed in a U-shape as seen in a sectional side view so as to cover the front, bottom and rear portions of the three-phase armature (the core 11 and the coils C1, C2 and C3).

The top core cover 13 has a planar configuration so as to cover the top of the three-phase armature. The top core cover 13 has a longitudinal groove 13a in the center of the upper surface thereof. A cooling pipe 16 for passing a refrigerant is accommodated in the groove 13a.

As shown in FIGS. 5 and 7, the side core cover 12 and the top core cover 13 are secured to each other through four cover mounting plates (connecting members) 14 inserted into respective slots S in the four corners of the core 11. That is, the four cover mounting plates 14 are secured at their lower ends to the side core cover 12 with screws and secured at their upper ends to the top core cover 13 with setscrews.

It should be noted that the cover mounting plates 14 are formed from an aluminum-based material having high thermal conductivity.

The space between the side core cover 12 and the top core cover 13 on the one hand and the three-phase armature on the other is filled with an epoxy resin material, which is a non-magnetic material, to form a resin molded structure M.

The resin molded structure M includes the ineffective conductor portions Ca of the coils C1, C2 and C3. Filling of the epoxy resin material allows the side core cover 12, the top core cover 13 and the three-phase armature to be integrated in close contact with each other.

The cooling pipe 16 is formed into a U-shape in external configuration and accommodated in the groove 13a on the upper surface of the top core cover 13. Both ends of the cooling pipe 16 are connected to couplings (half-unions) 18 through a coupling mounting plate 19 provided on one axial end of the moving part 10. The couplings 18 are connected to cooling pipings 17, respectively.

One cooling piping 17 supplies a cooling gas as a refrigerant to the cooling pipe 16. The other cooling piping 17 discharges the cooling gas passing through the cooling pipe 16. Accordingly, the cooling pipe 16 and the cooling pipings 17 operate as a heat exchanger that cools the three-phase armature by circulating the cooling gas.

As shown in FIG. 4, the table 15 is connected to the upper surface of the top core cover 13 at the center of the lower surface thereof and further connected to sliding blocks 31 of the linear guide 30 at both sides of the lower surface thereof. An object to be conveyed is secured to the upper surface of the table 15. The sensor moving part 41 of the linear encoder 40 is secured to one side of the table 15 in such a manner that a sensor faces toward the stationary part 20.

The stationary part 20 has a double-side excitation structure formed from field magnets 21 and a yoke 22.

The yoke 22 has a groove portion 22a formed in the upper surface thereof. The groove portion 22a accommodates the three-phase armature of the moving part 10 and the field magnets 21. Accordingly, the width of the groove portion 22a is equal to the sum of the widths of the three-phase armature and the field magnets 21, together with the gaps therebetween.

A pair of rails 32 constituting the linear guide 30 are secured to the upper surface of the yoke 22 at both sides of the groove portion 22a. Further, the linear scale 42 of the linear encoder 40 is secured to one side of the yoke 22 along the axis of the yoke 22. The linear scale 42 is fixed at a position facing the sensor of the sensor moving part 41.

The field magnets 21 are secured to both side walls of the groove portion 22a of the yoke 22 along the axis of the yoke 22 at respective positions facing the effective conductor portions Cb of the coils C1, C2 and C3 of the three-phase armature in the moving part 10. As shown in FIG. 4, the field magnets 21 are multipolar magnets magnetized in the sequence of a north pole, a south pole, a north pole . . . so that each pair of mutually opposing poles of the field magnets 21 have the same polarity, thereby forming axial magnetic flux. Furthermore, the width of one magnetic pole of the field magnets 21 corresponds to the sum of the widths of three slots S in the core 11.

[Operation of the High-Thrust Linear Motor]

Next, the operation of the high-thrust linear motor according to this embodiment will be described.

Figure 8:
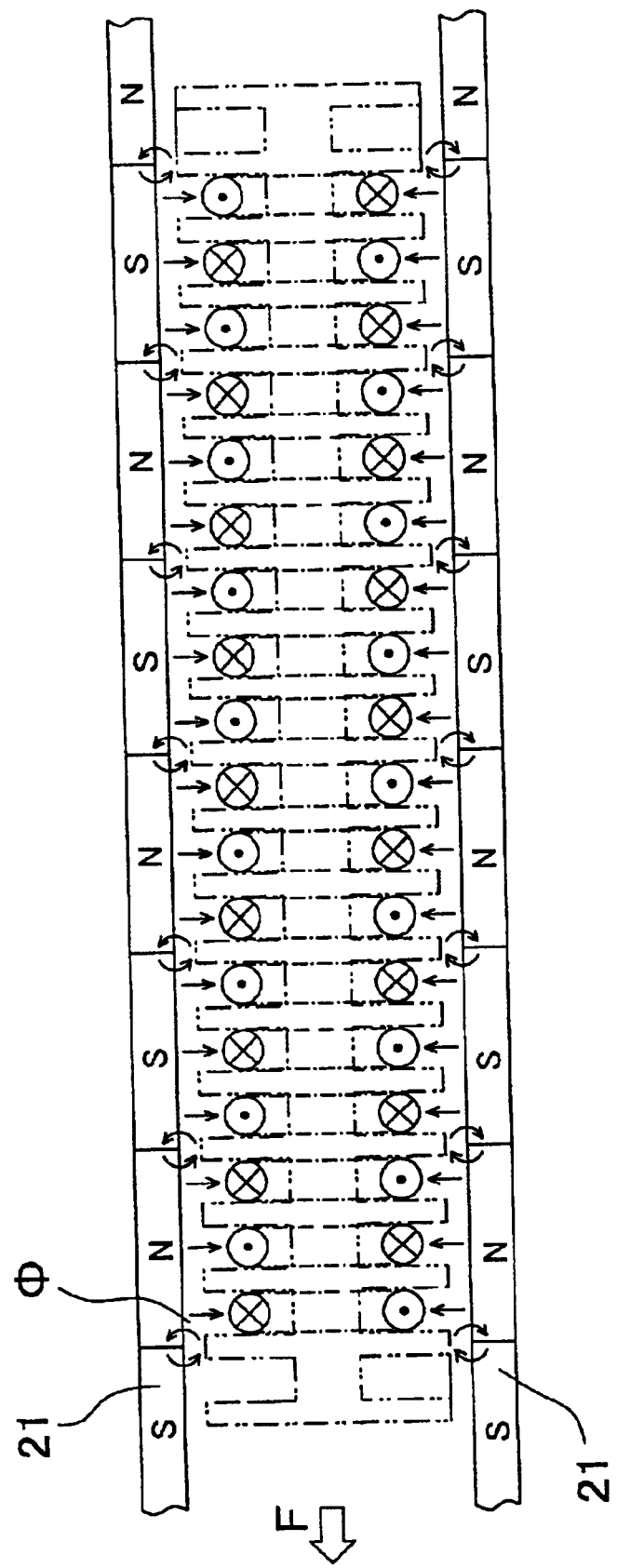
FIG. 8 is a diagram showing the positional relationship between three-phase coils and field magnets in the high-thrust linear motor according to the embodiment of the present invention.

Assuming that the left-hand side as viewed in FIG. 8 is the front side, when the coils C1, C2 and C3 are energized, electric currents flow alternately toward the front side, thus producing magnetic flux Φ. The magnetic flux Φ causes attractive force to act in the case of a north pole. In the case of a south pole, the magnetic flux Φ causes repulsive force to act.

Electric currents flow through the U-phase coil C1, the W-phase coil C2 and the V-phase coil C3 with a displacement of ⅓ pitch with respect to the width Pm of one magnetic pole. Consequently, the repulsive or attractive forces acting between the coils C1, C2 and C3 and the field magnets 21 generate an axial thrust F. Accordingly, the moving part 10 moves leftward in FIG. 5.

The direction of the vector of the thrust F is not necessarily horizontal but may be obliquely upward or downward. Even when the direction of the vector of the thrust F is obliquely upward or downward, because the movement of the moving part 10 is restricted by the linear guide 30 so that the moving part 10 is slidable only in a horizontal axial direction, the moving part 10 moves horizontally and axially.

In addition, because the three-phase armature is covered with the side core cover 12 and the top core cover 13 and these members are integrated into one unit with an epoxy resin material or the like, even if thrust F having an obliquely upward vector acts on the moving part 10, the moving part 10 is satisfactorily endurable without being distorted.

The sensor moving part 41 secured to the moving part 10 detects the present position by detecting the linear scale 42 secured extendedly to the side wall of the stationary part 20.

According to this embodiment, the slots S are formed on both sides of the core 11, so that the coils C1, C2 and C3 can be wound over the two sides of the core 11. Therefore, the space efficiency (density) of the coils C1, C2 and C3 is increased, and it is possible to obtain a higher thrust F than in the case of the conventional cored linear motor. Accordingly, it becomes possible to obtain a compact cored linear motor.

In this embodiment, the coils C1, C2 and C3 placed in the respective pairs of slots S on both sides of the core 11 have three phases and are wound in such a manner that each pair of adjacent phases are different in electrical angle from each other, as shown in FIGS. 7 and 8. Accordingly, it is possible to obtain a smooth operating condition equal to that obtained with a distributed winding type coil.

In this embodiment, the side core cover 12 and the top core cover 13 cover the core 11 and the coils C1, C2 and C3 approximately entirely, exclusive of the effective conductor portions Cb thereof.

Thus, the three-phase armature having the coils C1, C2 and C3 wound on approximately the whole area of the core 11 is covered with the side core cover 12 and the top core cover 13, whereby the three-phase armature is prevented from directly contacting the table 15 or other moving member and it can be surely secured through the side core cover 12 and the top core cover 13.

Furthermore, because the side core cover 12 and the top core cover 13 are provided as a pair of separate cover elements and the cover mounting plates 14 for integrally connecting the pair of cover elements are provided, it becomes easy to perform the operation of securing the core 11 and the coils C1, C2 and C3 to the side core cover 12 and the top core cover 13.

Furthermore, an aluminum-based material having high thermal conductivity is used as a material of the cover mounting plates 14, and the cover mounting plates 14 are disposed in contact with or in close proximity to the core 11. Consequently, the cover mounting plates 14 act as a radiator, whereby heat generated from the coils C1, C2 and C3 can be dissipated to the outside without storing it in the core 11. Accordingly, it is possible to prevent reduction of thrust F as occurs when the core 11 is heated.

Furthermore, the space between the core 11 and the coils C1, C2 and C3 on the one hand and the side core cover 12 and the top core cover 13 on the other is filled with an epoxy resin material to form a resin molded structure M, whereby the core 11, the coils C1, C2 and C3, the side core cover 12 and the top core cover 13 are integrated in close contact with each other. Accordingly, none of the constituent members will be deformed when the moving part 10 moves linearly or stops.

[Another Embodiment of the Present Invention]

In the foregoing embodiment, four cover mounting plates 14 are inserted into the slots S in the four corners of the core 11. However, the number of cover mounting plates 14 is not necessarily limited to four. That is, cover mounting plates may be additionally inserted into slots in an intermediate portion of the core when the width of the moving part is increased or the axial length of the moving part is increased.

Figure 10:
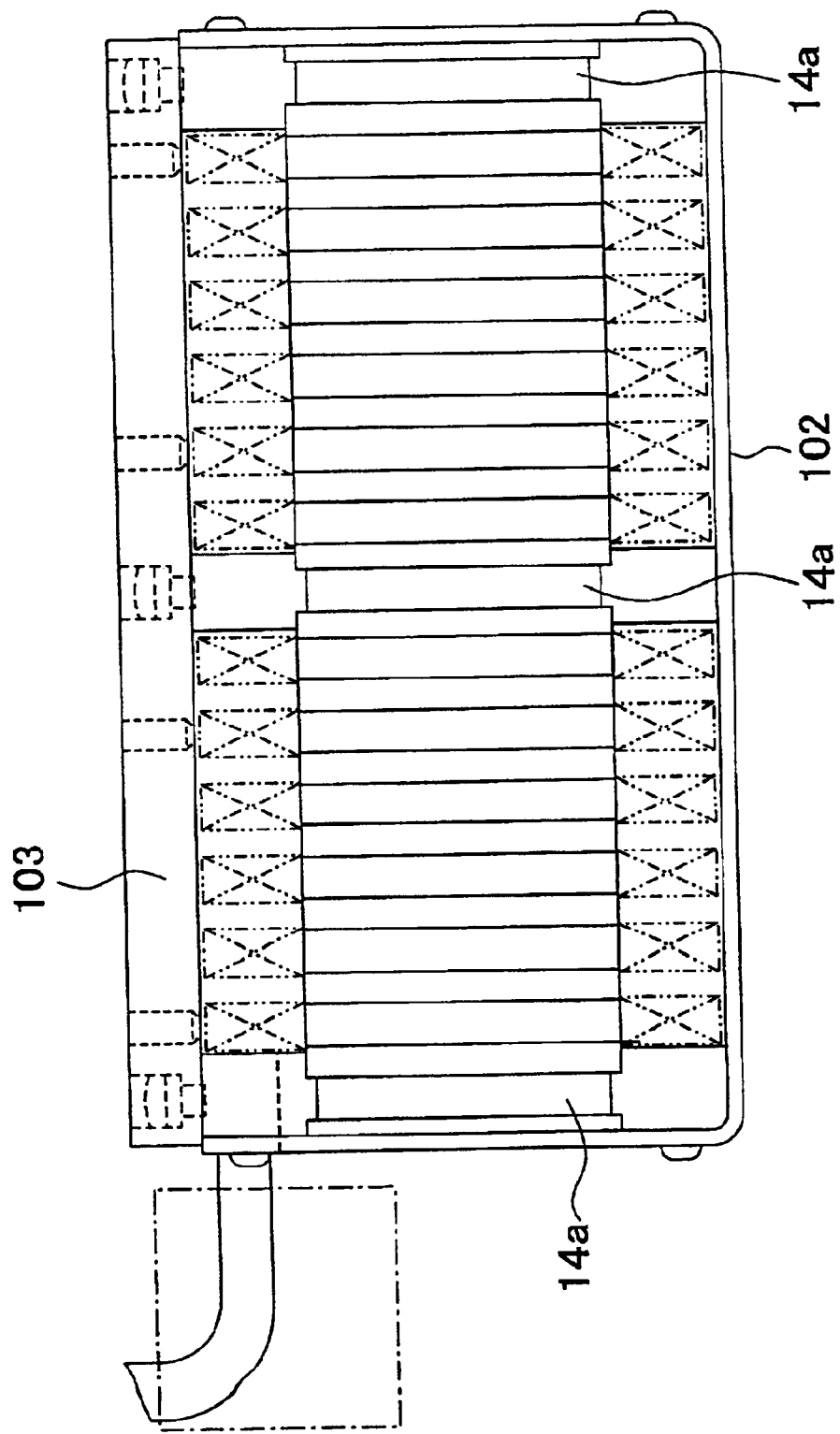
FIG. 10 is a cross-sectional view of a high-thrust linear motor according to another embodiment of the present invention.
Figure 11:
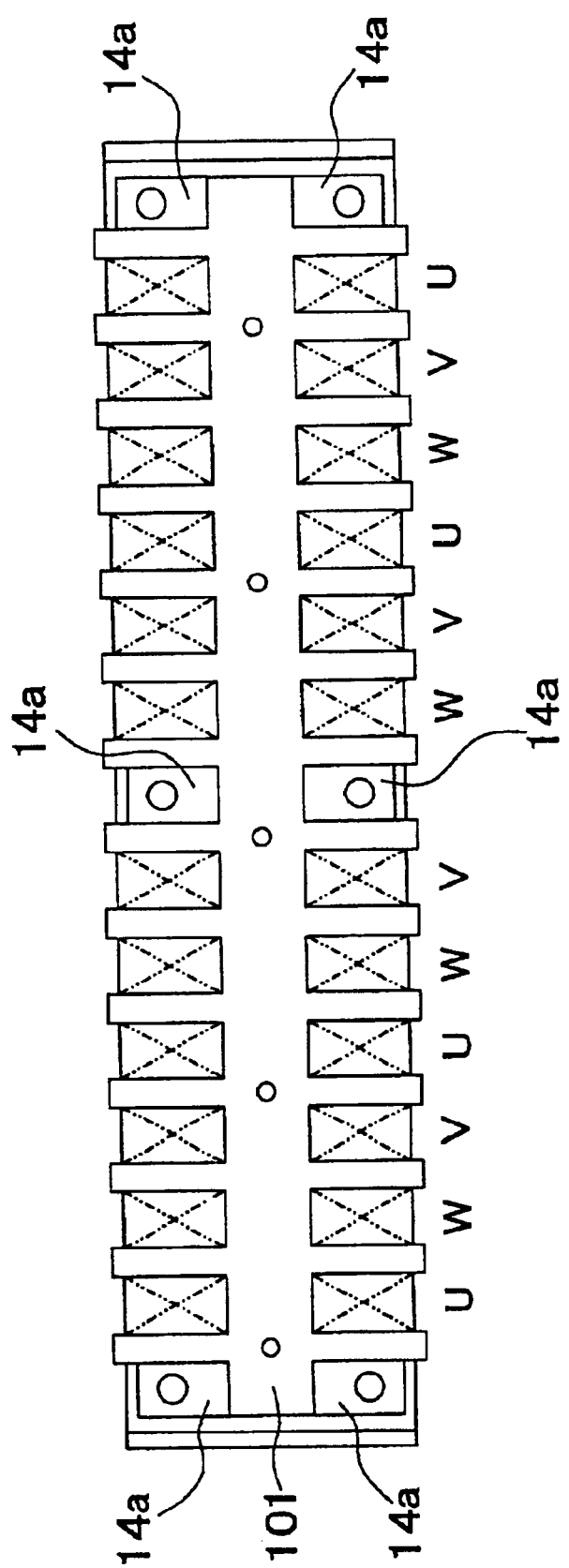
FIG. 11 is a sectional plan view of a moving part of the high-thrust linear motor according to the second embodiment of the present invention.

According to another embodiment of the present invention, as shown in FIGS. 10 and 11 by way of example, two cover mounting plates 14a are inserted into two slots S in an intermediate portion of the core 101 in addition to four cover mounting plates 14a inserted into respective slots S in the four corners of the core 101.

According to the second embodiment, the mechanical strength of the side core cover 102 and the top core cover 103 can be increased because the cover mounting plates 14a are inserted into the slots S in the intermediate portion of the core 101 in addition to the cover mounting plates 14a inserted into the slots S in the four corners of the core 101. In addition, it is possible to dissipate heat from the intermediate portion of the core 101 through the cover mounting plates 14a provided therein.

[Method of Producing the High-Thrust Linear Motor]

In the method of producing the high-thrust linear motor according to the present invention, a core 11 is prepared in which a plurality of slots S are formed in series in the axial direction so as to extend from both sides of the core 11 in opposite directions intersecting the axial direction in corresponding relation to each other. Then, the core 11 is wound with coils C1, C2 and C3 one after another (see FIG. 7). In the coil winding process, each of the coils C1, C2 and C3 is wound in a pair of slots S on both sides of the core 11 while the core 11 is being rotated.

According to this embodiment, coils are wound directly in slots of a core unlike the conventional process in which prewound coils are inserted into slots. Therefore, there will be no blank space where no coil is wound in the slots.

Accordingly, it is possible to obtain a smooth operating condition equal to that obtained with a distributed winding type coil. In addition, the space efficiency can be increased, so that increased thrust can be obtained. It is also possible to wind coils by a machine-wound process using a coil-winding machine. Accordingly, the assembly of the armature can be facilitated.

[Advantageous Effects of the Invention]

In the high-thrust linear motor according to the present invention, slots are formed on both sides of a magnetic member, and coils are wound over both sides of the magnetic member through the respective slots. Therefore, the space efficiency (density) of the coils is increased, so that it is possible to obtain higher thrust than in the case of the conventional cored linear motor. Accordingly, it becomes possible to attain a compact cored linear motor.

Further, the coils have a plurality of phases and are wound in the respective pairs of slots in the magnetic member in such a manner that each pair of adjacent phases are different in electrical angle from each other. Therefore, it is possible to obtain a smooth operating condition equal to that obtained with a distributed winding type coil.

Further, the armature having the coils wound on approximately the entire area of the magnetic member is covered with a cover member, and the cover member is secured to a table or other moving member. Therefore, the armature is prevented from directly contacting the table or other moving member, and the armature can be surely secured to the table or the like through the cover member.

Further, the cover member is divided into a pair of cover elements, and the pair of cover elements are integrally connected together with connecting members. With this arrangement, the operation of securing the magnetic member and the coils to the cover member is further facilitated.

Furthermore, the connecting members are formed from a material having high thermal conductivity and disposed in contact with or close proximity to the magnetic member. Therefore, the connecting members act as a radiator, whereby heat generated from the coils can be dissipated to the outside without storing it in the magnetic member. Accordingly, it is possible to prevent reduction of thrust as occurs when the magnetic member is heated.

Furthermore, because a non-magnetic material is filled in the space between the magnetic member and the coils on the one hand and the cover member on the other, the magnetic member, the coils and the cover member are integrated in close contact with each other. Therefore, none of the magnetic member, the coils and the cover member will be deformed when the assembly of these members moves linearly or stops. Accordingly, the assembly of the magnetic member, the coils and the cover member is suitable for use as a moving part.

In addition, according to the high-thrust linear motor producing method of the present invention, coils are wound in respective pairs of slots on both sides of the magnetic member while the magnetic member is being rotated. Thus, the coils are wound directly in the slots unlike the conventional process in which prewound coils are inserted into slots. Therefore, there will be no blank space where no coil is wound in the slots. Accordingly, it is possible to obtain a smooth operating condition equal to that obtained with a distributed winding type coil. In addition, the space efficiency can be increased, so that increased thrust can be obtained.

It should be noted that the present invention is not necessarily limited to the foregoing embodiments but can be modified in a variety of ways without departing from the gist of the present invention.

What we claim is:

1. A high-thrust linear motor comprising:

a magnetic member having a plurality of slots formed in series in an axial direction thereof, said slots extending from both sides of said magnetic member in opposite directions intersecting said axial direction in corresponding relation to each other;

coils each wound in a pair of said slots on both sides of said magnetic member;

field magnets extending in said axial direction at both sides of said magnetic member so as to face an effective conductor portion of each of said coils, said field magnets each having a plurality of pairs of magnetic poles magnetized in said axial direction;

a pair of flat plate covers for covering upper and lower surfaces of said magnetic member and said coils approximately entirely, exclusive of sides of said magnetic member and said coils which face said field magnets; and connecting means for integrally connecting together said pair of flat plate covers, wherein said coils have a plurality of phases and are wound in respective pairs of said slots in said magnetic member in such a manner that each pair of adjacent phases are different in electrical angle from each other.

2. A high-thrust linear motor according to claim 1, wherein said connecting means is formed from a material having high thermal conductivity and disposed in contact with or close proximity to said magnetic member.

3. A high-thrust linear motor according to claim 1 or 2, further comprising:

a non-magnetic material filled in a space between said magnetic member and said coils on one hand and said cover member on the other.

4. A method of winding coils of a high-thrust linear motor, said high-thrust linear motor comprising:

a magnetic member having a plurality of slots formed in series in an axial direction thereof, said slots extending from both sides of said magnetic member in opposite directions intersecting said axial direction in corresponding relation to each other;

coils wound each in a pair of said slots on both sides of said magnetic member; and field magnets extending in said axial direction at both sides of said magnetic member so as to face an effective conductor portion of each of said coils, said field magnets each having a plurality of pairs of magnetic poles magnetized in said axial direction, said method comprising the step of winding coils in respective pairs of said slots on both of said magnetic members while rotating said magnetic member.

* * * * *